(12) United States Patent
Wisecarver

(10) Patent No.: US 6,983,533 B2
(45) Date of Patent: Jan. 10, 2006

(54) DIFFERENTIAL PRESS TOOL

(75) Inventor: Martin Wisecarver, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 204 days.

(21) Appl. No.: 10/417,624

(22) Filed: Apr. 17, 2003

(65) Prior Publication Data

US 2004/0083907 A1 May 6, 2004

Related U.S. Application Data

(60) Provisional application No. 60/422,279, filed on Oct. 30, 2002.

(51) Int. Cl.
B30B 9/00 (2006.01)

(52) U.S. Cl. .............................. 29/799; 29/525; 29/559; 29/281.1; 29/464; 269/289 R; 100/289

(58) Field of Classification Search .............. 29/407.05, 29/407.09, 407.1, 464, 465, 525, 702, 703, 29/709, 714, 720, 559, 721, 281.1; 269/60, 269/76, 289 R, 303; 250/559.3, 559.29, 559.31; 100/230, 226, 289
See application file for complete search history.

(56) References Cited

U.S. PATENT DOCUMENTS 4,140,568 A * 2/1979 Beecher ...................... 156/560
6,615,477 B2 * 9/2003 Oshima ........................ 29/559
2003/0066191 A1 * 4/2003 Koster et al. .................. 29/861

OTHER PUBLICATIONS

U.S. Appl. No. 10/417,620, filed Apr. 17, 2003, Wisecarver.
U.S. Appl. No. 10/420,266, filed Apr. 22, 2003, Wisecarver, et al.
U.S. Appl. No. 10/420,207, filed Apr. 22, 2003, Wisecarver, et al.

* cited by examiner

Primary Examiner—Jermie E. Cozart
(74) Attorney, Agent, or Firm—Workman Nydegger

(57) ABSTRACT

Embodiments of the invention generally provide a fixture for assembling an optical component. The fixture includes a substantially rigid base member having an upper surface and a lower surface with a base aperture connecting the two surfaces and a component mounting plate positioned on the upper surface and having an aperture formed therein corresponding to the base aperture. The fixture further includes at least one pivotally mounted component disengagement member positioned on the upper surface and being configured to disengage a component from the mounting plate and a component securing member slidably positioned on the upper surface and being configured to secure a component to the mounting plate. Additionally, a differential press screw assembly is positioned on the lower surface, wherein the differential press screw assembly is configured to press a lens into a component mounted on the component mounting plate via extension of a press nut through the base aperture.

22 Claims, 10 Drawing Sheets

DIFFERENTIAL PRESS TOOL

CROSS-REFERENCE TO RELATED APPLICATIONS

This application claims benefit of U.S. provisional patent application ser. No. 60/422,279 filed Oct. 30, 2002 which is herein incorporated by reference.

BACKGROUND OF THE INVENTION

1. Field of the Invention

Embodiments of the invention generally relate to and apparatus and method for assembling optical components. More particularly, embodiments of the invention relate to an apparatus and method for assembling an optical source or an optical lens into an optical housing in a power-on state.

2. Description of the Related Art

Assembly of optical components is generally accomplished via simple mechanical operations that may be automated. Although the automation provides for increased throughput and accuracy in the assembly process, the components are nevertheless generally tested after the assembly process to determine if the component is within tolerances. Therefore, optical component assembly processes are generally a two step process, wherein the first step is the assembly and the second step, which is conducted in a separate apparatus, is generally an inspection step.

Inasmuch as multiple steps require more resources to manufacture components, is desirable to eliminate the requirement to assemble the component and measure the component in separate apparatuses.

SUMMARY OF THE INVENTION

Embodiments of the invention may generally provide an apparatus configured to assemble optical devices, and further, during the assembly process (real time), the apparatus measures input/output signals of the optical devices to correct optical offsets that may be inherent in the manufacturing process. The apparatus generally includes an outer frame and an inner frame, wherein the inner frame is vibrationally isolated from the outer frame, i.e., the inner frame is isolated from noise associated with or encountered by the outer frame. The inner frame generally supports a work plate configured to receive one of a plurality of component assembly fixtures thereon, wherein the individual fixtures are each configured for a particular optical component assembly process. The work plate also operates to position the assembly components relative to an optical measurement system, which is used to determine offset of the components prior to completion of the manufacturing process. The optical measurement system includes a camera adapted to receive an optical signal from an assembled optical device positioned in the assembly fixture. The camera receives light from a split light path having a specialized backlight system adapted to enhance the appearance of the optical signal. The output of the camera is fed into a data processing and display system configured to display the output to the user. The output may generally be presented to the user via a display, wherein the display may illustrate the focus of the output, intensity of the output, positioning of the output, and the offset of the output. Using the display, the user may adjust the offset of the component before assembly is completed, as well as measure and record various other optical parameters of the component that may be relevant to future component operation, installation, manufacturing, or other processes.

Embodiments of the invention may further provide an apparatus and method to assemble optical components and measure the resultant performance of the components during assembly and adjust the assembly process insitu to provide an improved optical component. The apparatus and method provide improved 3D imaging for positional information relative to the output optical signal of the component. The optical measurement system is vibrationally separated from a work plate to minimize installation errors. The apparatus is able to measure a plurality of input and output signals to determine the optical device performance during assembly. Position based on optical measurement system focus.

Embodiments of the invention may further provide an apparatus and method for measuring the optical offset of an optical component with a Z-Camera axis measurement device. The method generally includes loading a component shell into a fixture mounted on the measurement apparatus and then inserting an optical source into the component shell. The optical output of the component is then observed by a camera positioned below the component. The camera transmits the image of the optical signal to a processing device, i.e., a PC, that displays the position/offset of the device to the user. In response to the displayed offset, the user may adjust physical parameters of the component in order to correct for the offset prior to final assembly of the component. The correction may be automated in that the system controller may operate to control a process configured to automatically adjust the physical parameters of the component to correct for the offset.

Embodiments of the invention may further provide an automated component assembly fixture and method configured to press an optical assembly into a housing/body when used in conjunction with an optical component installation and measurement apparatus. The automated apparatus/method of the invention generally includes relieving backlash in the assembly system by making a movement in the direction of the assembly, checking for a signal, adjust the x and y coordinates to obtain the signal in the measurement plane, determine the quadrant of the signal, adjust the z position and re-verify the image x and y plane, scan in z to determine the focus, subtract an empirical number from the z distance and drive to that distance, take a fine z measurement, calculate the appropriate z distance, drive to the calculated z distance, and release the assembled part. This process essentially guarantees a 100% part assembly and focus without generating any throwaways as a result of overshoot.

Embodiments of the invention may further provide a component assembly fixture configured to press an optical assembly into a housing/body when used in conjunction with an optical component assembly and measuring apparatus. The fixture is based upon a top press-type operation, wherein the optical assembly is pressed into the housing from the backside (electrical contact side) of the optical assembly. The top press configuration provides for high pressure assembly with great accuracy, and therefore, the focus of the optical assembly may be set without overshoot, which conventionally results in rendering the component unusable. Additionally, the top press provides easy insertion and removal of components. The physical structure generally includes two slide pins, that capture a pivot point so the pivot point and distally extending a work bridge may press the optical assembly into the body/mount. Top press allows for high accuracy press assembly, increased throughput, reduced/eliminated throwaways, and easy access for insertion and removal of components.

Embodiments of the invention may further provide a component assembly fixture configured to press an optical assembly into a housing/body when used in conjunction with an optical component assembly and measurement apparatus. The fixture is based upon a differential press screw that has two opposing thread speeds. Therefore, one side of the differential press screw actuates the housing in a positive z direction, while the second side of the differential press screw actuates the optical assembly in a negative z direction. This actuation causes the optical assembly to be pressed into the housing with great precision using very fine movements at very high pressure with large circumferential movement of the actuator itself. Thus, the focus of the optical assembly may be set without risking overshoot, which conventionally results in rendering the component unusable. Additionally, the present invention provides a substantial improvement in throughput, about 5 times conventional assembly speeds. The differential screw allows for precise pressing at very high pressures, which allows for pressing an optical source into a housing in a one shot-type method without overshooting the focus and rendering the part a throwaway—also without requiring more than one measuring step, as with conventional assembly apparatuses.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
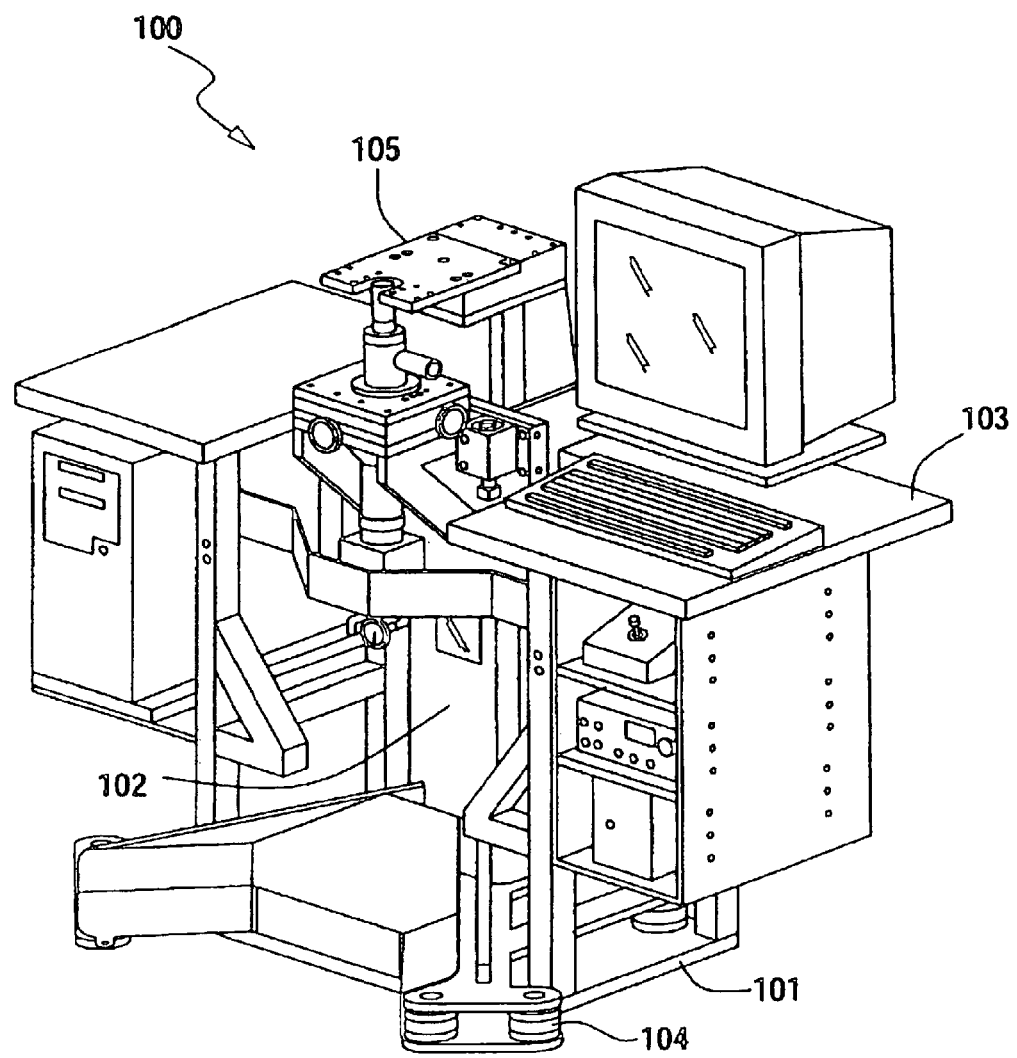
FIG. 1 illustrates a perspective view of an embodiment of the invention.

FIG. 1 illustrates a perspective view of an embodiment of the invention. The optical component assembly apparatus 100 generally includes a substantially rigid base member 101 that supports an inner frame member 102. Inner frame member 102 is generally separated from the rigid base member 101 via a plurality of cushioning devices 104. The cushioning devices 104, which may be air isolators, for example, are generally configured to isolate the components attached to inner frame member 102 from any ambient ground noise. The upper portion of inner frame member 102 generally includes an optical component press and measuring assembly 105. Further, the substantially rigid base member 101 may also support an outer frame member 103, which may include storage space for the mechanical and electronic devices needed to operate the optical component assembly apparatus 100, while also providing an upper working surface for the operators of the apparatus.

More particularly, inner frame member 102 is generally secured to rigid base member 101 via a plurality of airbags actuators 104. Further, as illustrated in FIG. 1, inner frame member 102 generally includes a plurality of legs radially extending therefrom, which generally attach to the rigid base member 101 via airbags 104. The radial extension of the plurality of legs from inner frame member 102 provides for a wide and stable base for the operational components of optical component assembly apparatus 100, which as will be described further herein, generally attach to the upper portion inner frame member 102. Furthermore, since it is desirable to isolate the working components of the assembly apparatus 100 from ambient noise sources, in addition to inner frame member 102 being isolated from rigid base member 101 via airbags 104, the outer frame member 103 is also isolated from inner frame member 102. More particularly, although outer frame member 103 may include several components of the optical component assembly apparatus 100, outer frame member 103 is generally not rigidly secured or attached to inner frame member 102, and therefore, any actuation of the outer frame member 103 will not affect the component assembly and or measuring process taking place within the operational components of apparatus 100 that are secured to the upper portion of inner frame member 102.

Figure 2:
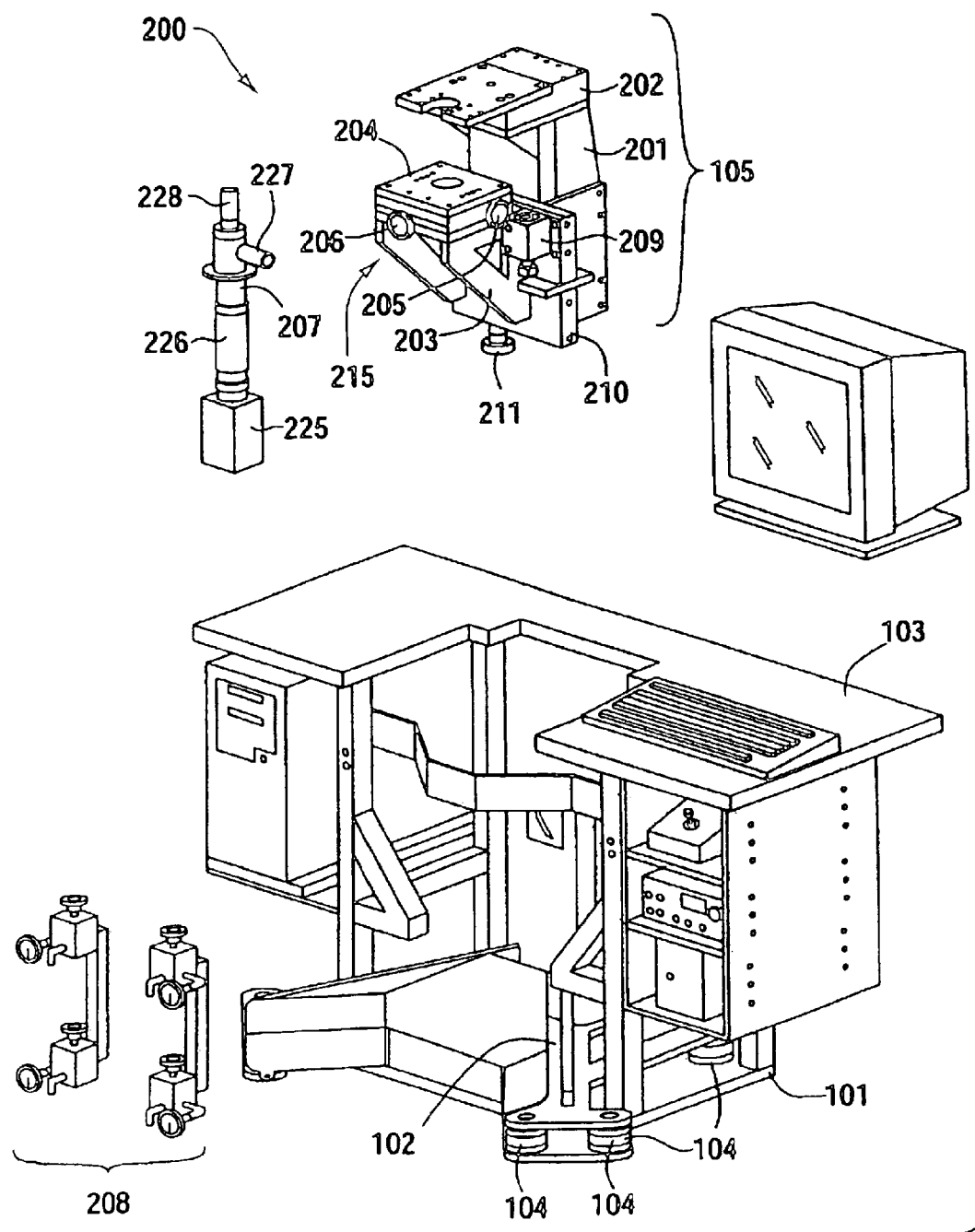
FIG. 2 illustrates a partial exploded view of an embodiment of the invention.

FIG. 2 illustrates a partial exploded view of an embodiment of the invention, and more particularly, FIG. 2 illustrates the optical component assembly apparatus 100 of the invention, wherein the optical component press and measuring assembly 105 is removed from inner frame member for better illustration. The optical component press and measuring assembly 105 is generally secured to an upper portion of inner frame member 102 via a second frame member 201. Second frame member 201 generally supports a fixture support 202 on an upper portion thereof. As such, the second frame member 201 and fixture support member 200 are generally rigidly attached to inner frame member 102. Second frame member 201 also is slidably engaged with a component press and measuring assembly 215 via a Z slide 210. Z slide 210 generally operates to allow the component press and measuring assembly 215 to move in a Z direction with respect to the inner frame member 102, wherein the Z direction is generally defined as vertically with respect to the substantially rigid base member 101. However, Z slide 210 is generally configured to present motion of the component press and measuring assembly 215 in any direction other than the Z direction. Additionally, inasmuch as isolation of the component press and measuring assembly 215 is an important element of the present invention, Z slide 210 may further include a pneumatic neutralizer 209 attached thereto, wherein neutralizer 209 is generally configured to apply an upward force to the component press and measuring assembly 215 sufficient to neutralize the gravitational force being exerted thereon.

The remaining components of the press and measuring assembly 215 are generally supported by a pair of upstanding frame members 203, wherein the upstanding frame member 203 are generally attached to a surface of the Z slide 210. Therefore, when slide 210 is actuated by the manual actuator 211, which generally operates to move slide 210 in an upward or downward motion, the remaining components of the press and measurement assembly 215 will also move upward or downward, as they are rigidly attached to slide 210 via frame members 203. However, it is to be noted that slide 210 moves relative to frame member 201 and 202, and therefore, movement of slide 210 causes the press and measuring apparatus 215 to move relative to the remaining components of the invention. Generally speaking, the remaining components generally include an adjustable table 204 and an optical measuring device 207. The adjustable table 204 generally attaches to the upper portion of frame members 203, and is configured to linearly move in both X and Y directions, while preventing movement of table 204 in the Z direction. The movement of table 204 may be controlled by two manual actuators, wherein a first actuators 205 is configured to move table 204 in the X direction, while the second manual actuators 206 is configured to move table 204 in the Y direction. Therefore, embodiments of the invention essentially provide for movement of table 204 in three dimensions, i.e., x, y, and z, via actuation of manual actuators 205, 206, and 211, respectively. Therefore, embodiments of the invention provide for a table 204 that may be precisely moved in a three-dimensional space with respect to a fixed plate, i.e. plate 202, for the purpose of measuring and/or pressing optical components into optical housings or other areas.

FIG. 2 also illustrates another feature of the optical component assembly apparatus 100. More particularly, FIG. 2 illustrates a plurality of air pressure regulators 208, which are generally in fluid communication with individual air bags 104. As such, when a force is exerted on an individual side of the leg portions of frame member 102, a change in the air pressure was in the corresponding airbags 104 will be noticed in a corresponding one of the pressure regulators 208. In response thereto, the air pressure to be airbags 104 may be increased and or decreased to maintain frame member 102 in a predetermined orientation, i.e., to maintain frame member 102 in a vertical orientation, for example. Therefore, embodiments of the invention may include a controller, i.e., a microprocessor type controller, for example, which may be in electrical communication with air bag regulators 208, and therefore, operate to automatically maintain the predetermined orientation of frame member 102. Additionally, another pressure regular 208 may be in fluid communication with pneumatic cylinder 209 for the purpose of maintaining slide 210 in essentially a zero gravity type situation.

Optical measuring device 207 generally includes a camera 225 positioned on a lower portion thereof. An intermediate portion of optical measuring device 207 generally includes a magnification unit 226 that is in optical communication with an intermediate assembly configured to provide backlight to the entire optical measuring device 207. The upper portion of optical measuring device 207 may include a lens assembly 228 configured to receive optical signals therein and transmit the optical signals through the entire optical measuring device 207 to the camera 225. Optical measuring device 207 is generally mounted within press and measuring assembly 105, and more particularly, optical measuring device 205 is generally mounted such that the lens assembly 228 is positioned immediately below an aperture formed in movable plate 204. Therefore, in this configuration, lens assembly 228 is configured to view an optical signal generated from an optical component mounted within a fixture positioned on upper work plate 202.

Figure 3:
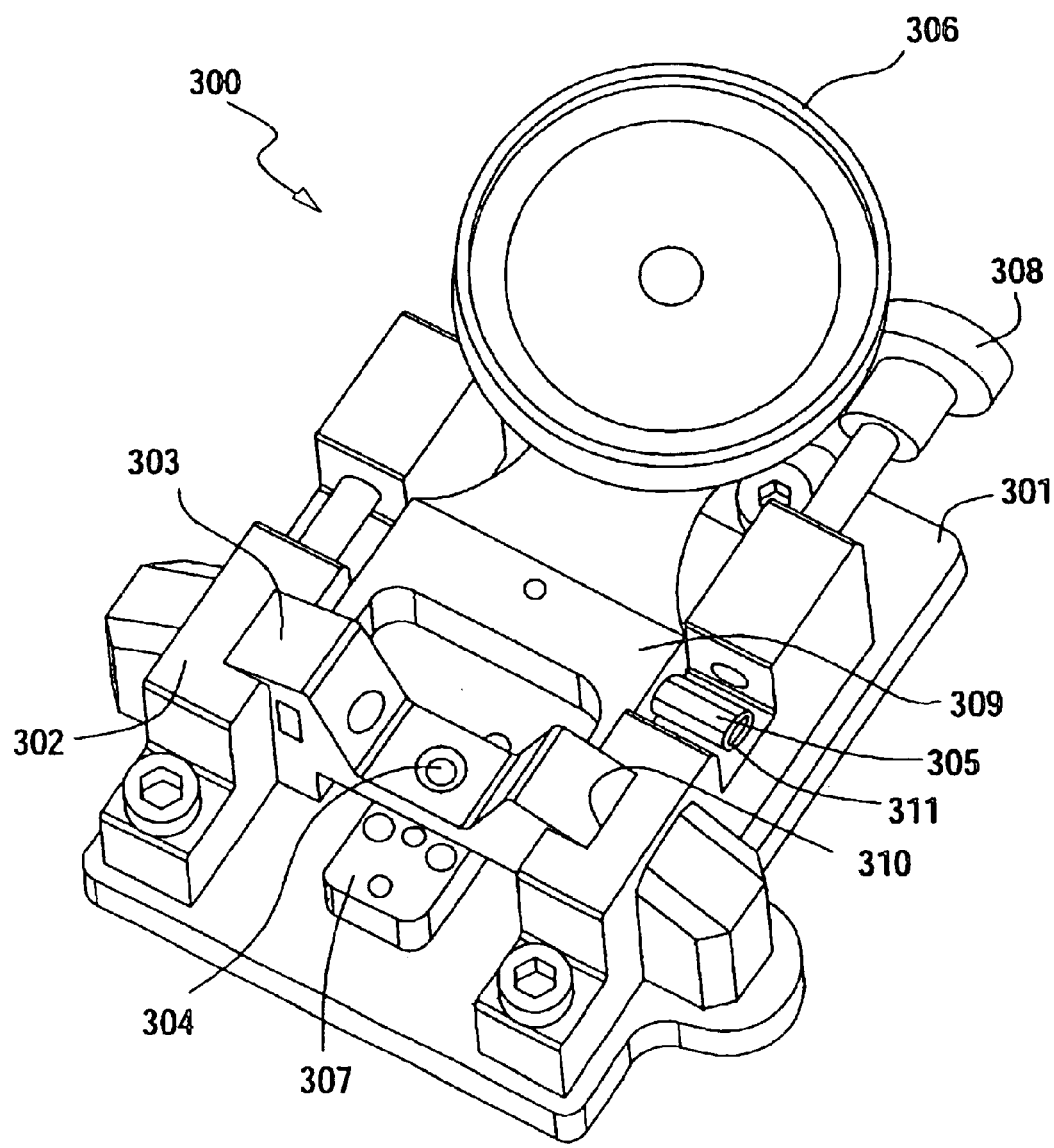
FIG. 3 illustrates a perspective view of an exemplary cam operated laser press assembly fixture of the invention.

FIG. 3 illustrates a perspective view of an exemplary cam operated laser press assembly fixture of the invention. Press assembly 300, which may also be termed a press tool, generally includes a substantially rigid base member 301 that supports the remaining elements of press assembly 300. A pair of upstanding support members 302 are attached to base member 301 in a configuration that provides for a working space between the two support members 302. The inner surfaces of upstanding support members 302 include a vertical channel 310 formed therein, wherein the respective channels 310 formed into the support members 302 are positioned opposite of each other. Additionally, a central portion of support members 302 includes a recess 311 configured to support a pivotally mounted arm 309. A pair of longitudinal apertures are also formed into support members 302, wherein the apertures are configured to support pivotal securing members 308 therein. Pivotal support members 308 are slidably positioned within the apertures and are configured to be actuated to secure a pivotal mount 305 to support members 302. A workpiece support press 303 is positioned between support members 302, and in particular, support press 303 is slidably positioned within vertical channels 310. As such, support press 303 is configured to move only in the direction of channels 310, which is vertical in the present exemplary embodiment. Press assembly 300 further includes a pivotally mounted press arm 309 pivotally mounted to support members 302 via shafts/pivotal mounts 305. Press arm 309 attaches to support press 303 at a first end, mounts to support members 302 via pivot mount 305 in a middle portion, and attaches to a screw member 306 at a second end. In this configuration screw member 306 may be actuated to pivotally move press arm 309 such that support press 303 moves vertically within channels 310. Press assembly 300 further includes a component mount 307 positioned below support press 303 such that a component may be supported on component mount 307 and pressed into a housing supported within aperture 304.

Figure 4:
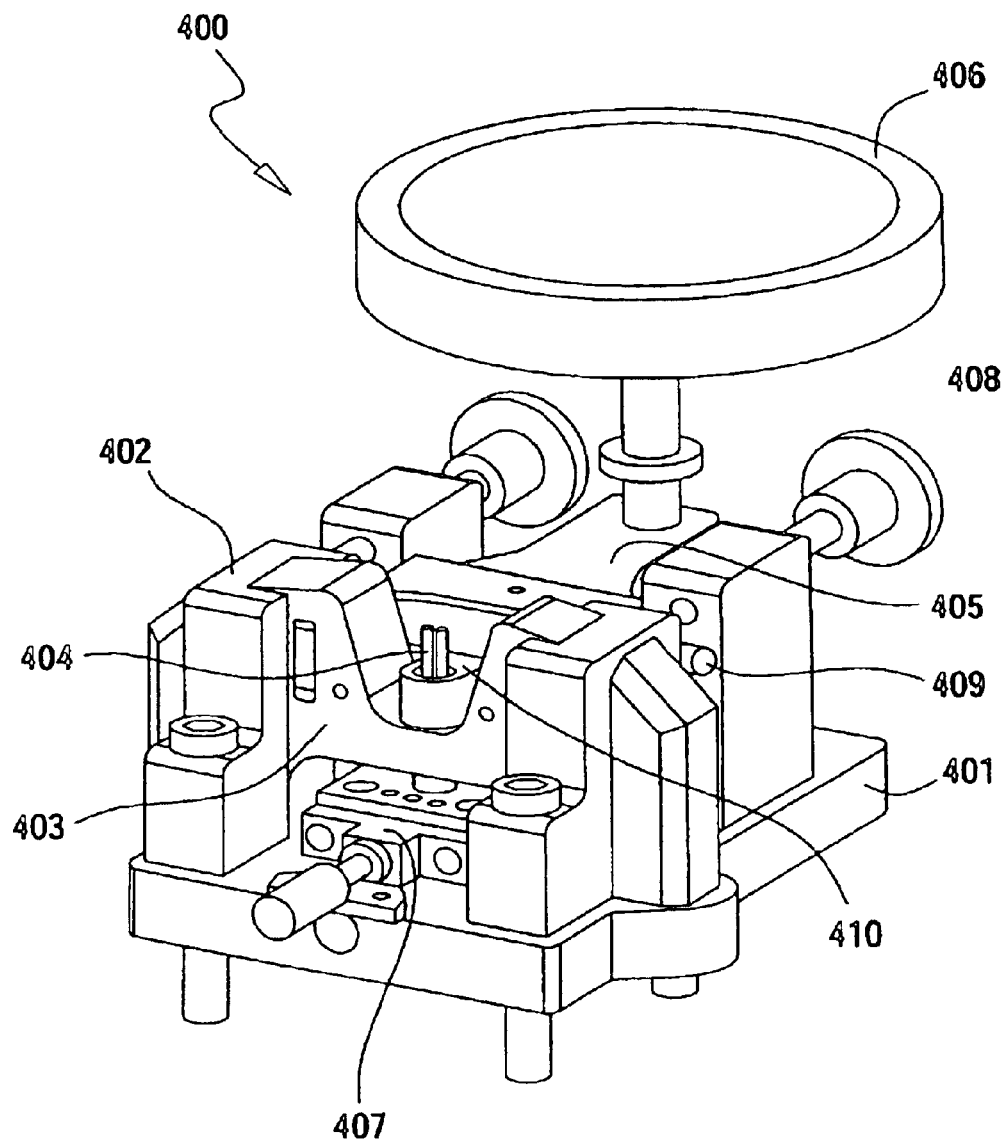
FIG. 4 illustrates a perspective view of an exemplary cam operated laser press assembly fixture of the invention having a component therein.

FIG. 4 illustrates a perspective view of an exemplary cam operated laser press assembly fixture of the invention having a component therein. The exemplary press assembly 400 includes components similar to the assembly 300 shown in FIG. 3. In particular, press assembly 400 includes a base 401, support members 402, press support 403, press arm 405, and screw 406. Press assembly 400 also includes a component support 410 mounted at distal ends to press support 403. Component support 410 is attached to press supports 403 such that component support 410 remains stationary with respect to press support 403.

Figure 5:
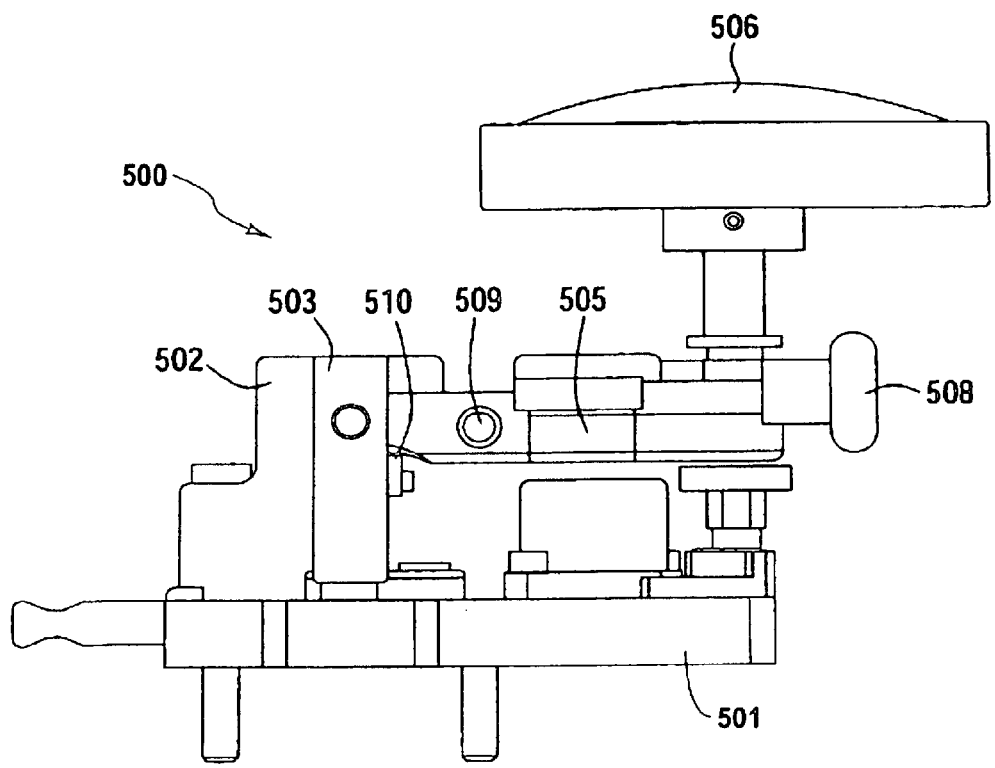
FIG. 5 illustrates a side perspective view of an exemplary cam operated laser press assembly fixture of the invention.

FIG. 5 illustrates a side perspective view of an exemplary cam operated laser press assembly fixture or press tool of the invention. The press assembly 500 includes a base 501, an upstanding support 502, slidably mounted press support member 503, a pivotally mounted press arm 505, and a screw assembly 506. Additionally, a fixed component mount 510 is illustrated. In this embodiment, screw assembly 506 may be actuated to drive a second end of arm 505 upward as a result of pivotal movement about a pivot point 509. The pivotal movement causes a first end (the end opposite second end that is attached to the press support member 503) to move downward. In this manner an optical housing secured within component mount 510 may have an optical component (optical source, lens, or other component) pressed therein by press support member 503 via engagement of the component with a stationary fixture or component press mounted to the base 501.

More particularly, in operation, the embodiments of the invention illustrated in FIGS. 3, 4, and 5 generally operate in the same manner to press a laser into an optical housing. In particular, the press assembly is generally configured to support an optical housing in a face down manner, i.e., in a manner such that the output of the optical component is directed toward the base plate 401, for example. In this manner the power leads for the laser being pressed into the housing are generally extending upward from the housing having the laser therein such that a power fixture may be attached to the power leads in order to power the laser during the pressing operation. As such, the laser is generally operating, i.e., emitting an optical signal during the pressing process. However, as noted above, the efficiency and intensity of the optical signal is dependent upon the pressed position of the optical source or laser. Therefore, it is critical that the optical source be pressed to a precise depth within the optical housing such that the output is optimized. This optimization is generally dependent upon the optical source being pressed to the optimal focal point within the optical housing. Further, the base member generally includes an aperture positioned below the optical housing having the laser pressed therein, such that the optical output of the laser is directed through the aperture. Thus, when the screw assembly is actuated, the press arm moves downward and presses the activated optical source into the housing while the optical signal generated by the optical component is transmitted downward through the base of the fixture. This signal may then be observed by the camera positioned there below.

Figure 6:
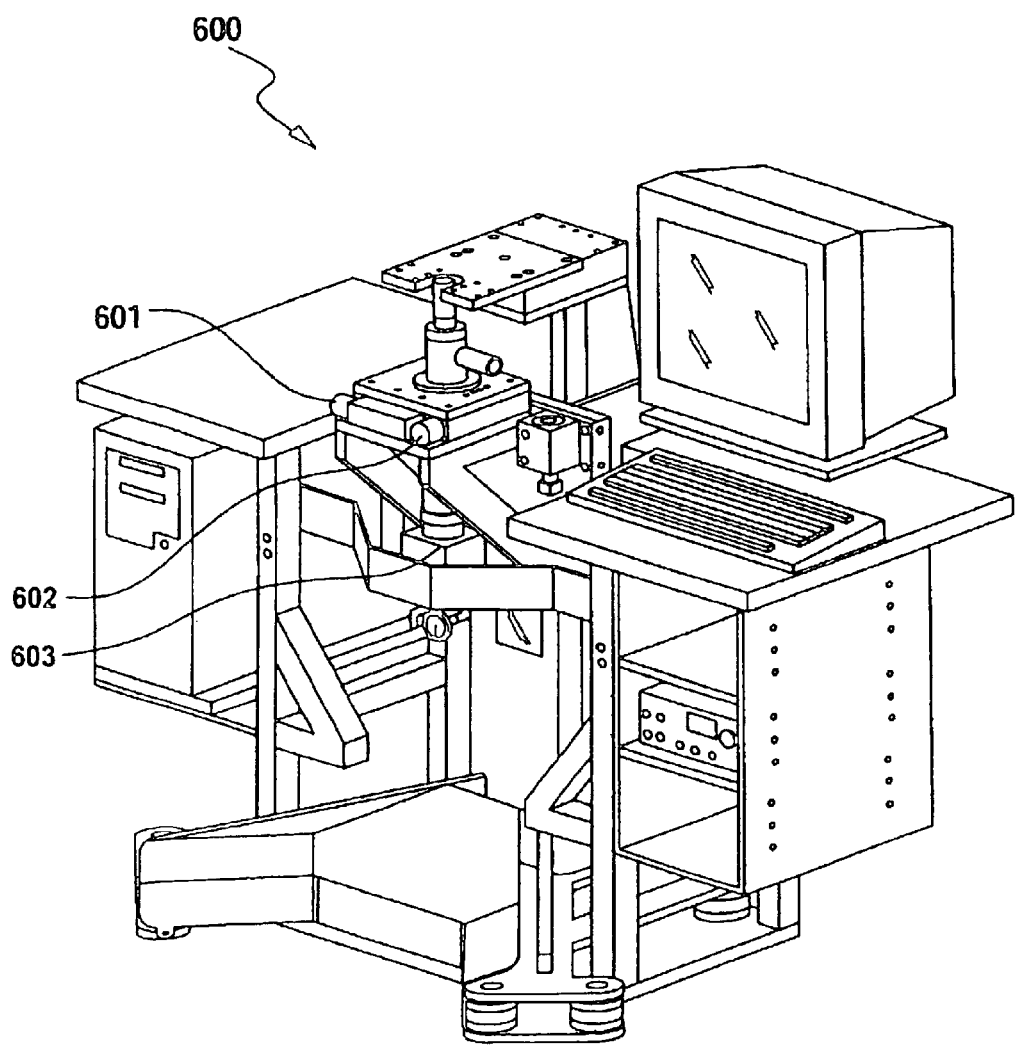
FIG. 6 illustrates a side perspective view of an exemplary automated cam operated laser press assembly fixture of the invention.

FIG. 6 illustrates a side perspective view of an exemplary automated cam operated laser press assembly fixture or press tool of the invention. The automated press assembly 600 generally includes components similar to the previously discussed press assemblies, however, the adjustment of the x, y, and z position of the press and/or camera is accomplished via an automated process, i.e., without manual adjustment. The press assembly 600 generally includes a y-axis actuator 601, an x-axis actuator 602, and a z-axis actuator 603. Each of the respective actuators are in communication with a system controller configured to control the operation of the actuators. The controller is generally configured to receive input from the camera mounted on the press and measurement assembly and actuate each of the respective actuators in order to obtain an optimal optical parameter. For example, the actuators may be controlled to press a lens into an optical mount to an optimal focal point via measurement of the output intensity and shape of the optical output of the component. Similarly, the automated press assembly 600 may be configured to press an optical source into an optical housing to an optimal depth via an automated process.

Generally, the automated process includes monitoring the optical output of the component being assembled via a camera, such as camera 225 illustrated in FIG. 2. The camera, or other device configured to measure an output parameter of an optical source, may be in communication with a controller, such as a micro processor-type controller, for example. The controller is generally configured to compare the output to a preferred or predetermined output, and then adjust the x, y, and/or z position adjustments in order to adjust the output closer to the desired output. The process may continue until the output is within an acceptable range, which is generally optimal for the component. The analysis and/or comparison process of the controller may be conducted in accordance with a software program stored in memory and executed on a processor.

Figure 7:
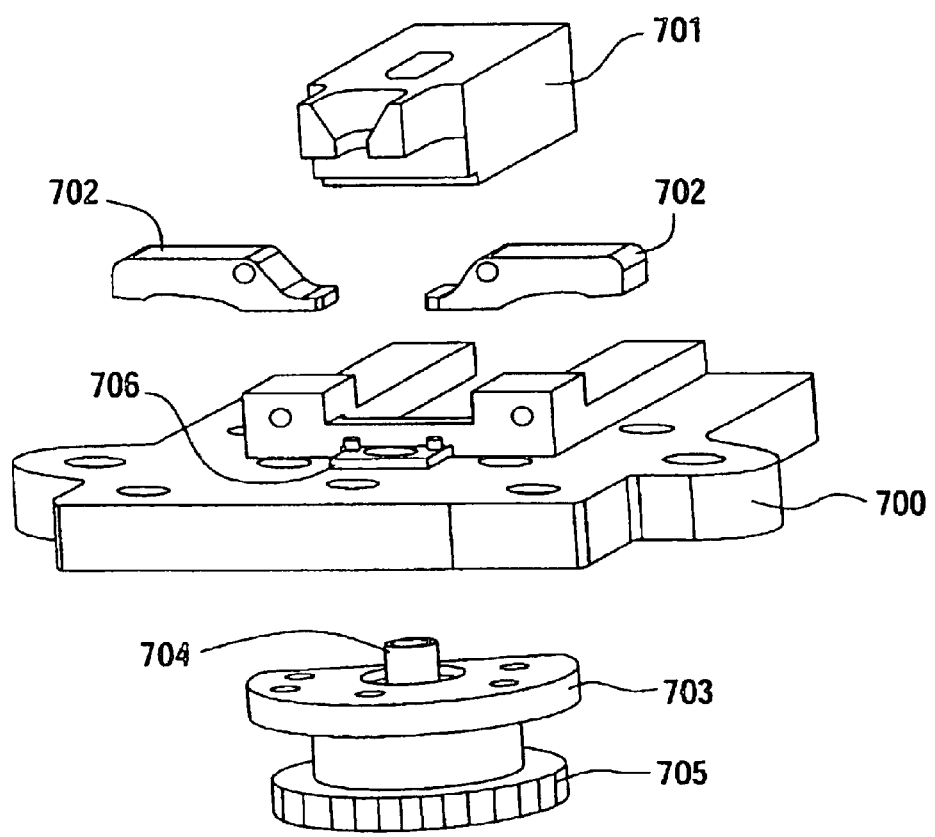
FIG. 7 illustrates an exemplary fixture of the invention that utilizes a differential press screw assembly.

FIG. 7 illustrates another fixture or press tool that may be implemented with the press and measuring assembly of the invention. The press fixture illustrated in FIG. 7 generally includes a substantially rigid base 700. A slidably positioned assembly clamp 701 is positioned on an upper side of base member. Clamp 701 is generally configured to slide into a position to secure an optical component to a workpiece support 706 during the press or measurement operation. Additionally, a pair of release latches 702 are generally positioned adjacent the support 706, wherein the release latches are configured to raise an optical component secured to the support once the pressing operation is completed. The lower side of base 700 generally includes differential press screw assembly 703 that includes a screw actuator 705 and a lens press nut 704. The differential press screw 703 threadebly engages base 700, and therefore, may be actuated into base 700 via rotational actuation of screw actuator 705. In this configuration a lens or other optical component may be positioned on the lens nut 705 and pressed into an optical housing secured on support 706.

Figure 8:
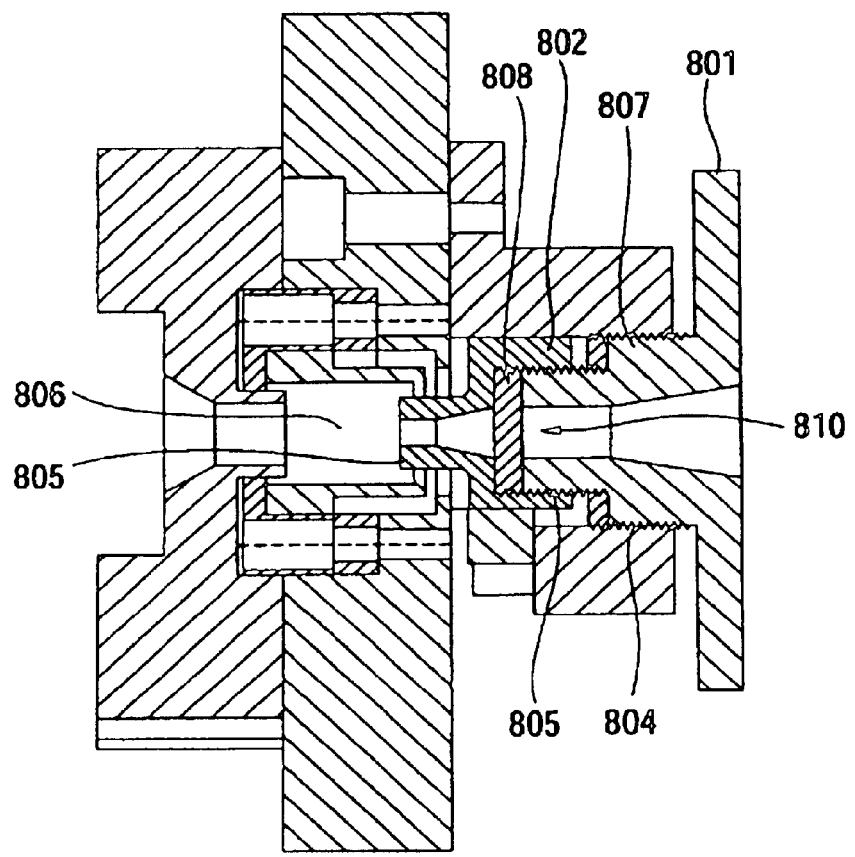
FIG. 8 illustrates a sectional view of the differential press screw assembly illustrated in FIG. 7.

FIG. 8 illustrates a sectional view of the differential press screw assembly illustrated in FIG. 7. The differential press screw assembly generally includes a hollow interior optical path 810 and an outer screw actuator 801 that has a first annular surface including a first threaded region 804 formed thereon. Screw actuator 801 further includes a second annular region having a second threaded region 803 formed thereon. Screw actuator is assembled into the fixture by threadebly engaging a first inner threaded surface with the first threaded region 804. A distal extending end of the actuator 801, i.e., the end proximate the second threaded region, extends into an inner cavity of the fixture, where a lens press nut 805 is slidably positioned. Lens press nut 805 includes an outer surface that slidably engages the inner surface of the fixture. Additionally, an inner surface of nut 805 includes a threaded bore 808 that is configured to threadebly engage the second threaded region 803 of actuator 801. In this configuration, screw actuator may be rotated to cause the lens press nut 805 to extend into an optical component space 806. Thus, in operation, a lens to be pressed into an optical component may be positioned either on nut 805 or within an optical component that is positioned or secured within component space 806. With the component secured, the screw actuator may be rotated to press the lens into the respective optical housing to a specific depth. The depth may be set by the mechanical setup of the differential screw, or alternatively, the depth may be determined through an automated process. For example, embodiments of the invention may utilize the camera assembly 225 illustrated in FIG. 2 to analyze the output of the optical component having the lens pressed therein. The analysis process, which will be further discussed herein, generally includes pressing the lens into the component while simultaneously viewing the optical output of the component. This output may be compared to a desired optical output to determine if the lens has been pressed into the component to the proper depth, i.e., to the focal point.

In operation, embodiments of the invention provide a method for assembling and/or measuring optical properties of an optical component. The assembly and measurement process may be accomplished real time, i.e., the optical component may be active during the assembly and/or measurement processes. For example, assuming that the component being assembled and/or measured is an optical component having an optical source therein, then the optical source may be assembled within an optical housing with the power to the optical source being on during the assembly process. The assembly process generally includes pressing either an optical source, i.e., a laser, into a component, or alternatively, pressing an optical component, i.e., a lens, into a component already having a source via a press tool (various press tools and configurations may be used without departing from the scope of the invention). In this manner, the optical output of the component may be measured during the assembly process. Further, the optical output may be used as a control parameter for the assembly process, as the intensity, shape, contrast, and other parameters of the optical output may be measured and compared to a desired value in order to determine, for example, if the optical source is optimally positioned within the optical housing.

Figure 8A:
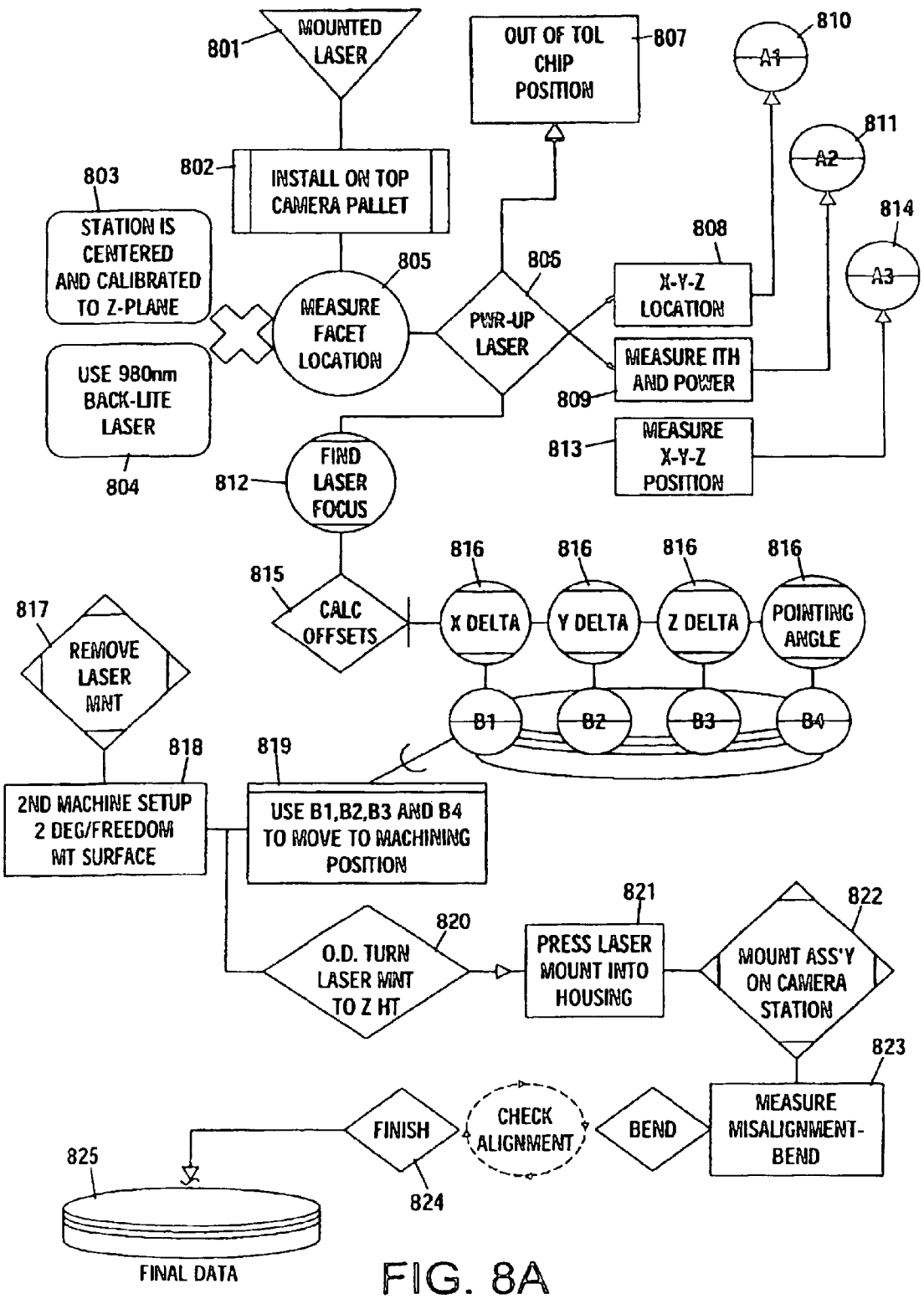
FIG. 8a illustrates a flow diagram of an exemplary method of the invention.

More particularly, FIG. 8a illustrates a flow diagram of an exemplary method of the invention. The methodology illustrated in FIG. 8a is directed to an embodiment of the invention wherein an optical source, i.e., a laser for example, is pressed into an optical housing. However, it is to be understood that the present invention is not intended to be limited to this embodiment, as the methodology is generally applicable to assembling various optical components that emit an optical signal. For example, the methodology may be utilized to press a lens into an optical component while monitoring the output of the component to determine when the lens is pressed to an optimal point, such as the focal point, for example. Further, the inventors contemplate that various other optical components may be assembled using the basic methodology of the invention.

The exemplary method illustrated in FIG. 8a is generally directed to an embodiment wherein a laser is being pressed into an optical housing. Therefore, the embodiment illustrated in FIG. 8a is generally configured to press the laser to an optimal distance within the optical housing such that the optical output is optimized. The process of pressing the laser to the desired distance is accomplished by pressing the laser while observing the output of the component, as the laser is powered on during the pressing process. The laser is then pressed until the output is observed as being optimal, which corresponds to the optimal press depth. The method generally begins at step 801 wherein a laser is pre-mounted into an optical housing. At this stage the laser is generally mounted within the housing, but is mounted such that the laser may be longitudinally actuated within the housing in order to adjust the position of the laser relative to other components within the housing. Once the optical sources are mounted within the optical housing, the entire component may be mounted within a palette or fixture configured to secure the component for the press and measurement operations. For example, the optical component may be mounted within a fixture, such as the exemplary fixtures illustrated in FIGS. 3, 4, 5, 7, or 8. Once the optical component is secured in the appropriate fixture, the fixture may be secured to an apparatus configured to press the optical source within the optical housing, as well as measure the optical output of the component during the pressing process.

However, prior to initiating any measurement processes, embodiments of the invention generally provide for initializing the apparatus for conducting the pressing and measurement processes. For example, steps 803 and 804 of FIG. 8a illustrates initialization steps that are generally conducted prior to beginning a press and measurement process, or alternatively, prior to beginning a press and measurement process for a plurality of components, i.e., a batch. The initialization steps 803 generally corresponds to the processes associated with centering the working surface upon which the above-mentioned fixtures will be mounted with respect to a machine reference center. Further, step 803 may also include initializing the station to a reference Z plane, i.e., determining the Z position of the working surface with respect to the other components of the system, or alternatively, with respect to a reference Z position. Step 804 further illustrates initialization processes, and in particular, illustrates and initialization process that includes making initialization measurements with a backlight laser in a power off position. Initialization process of the present invention may further include initializing control devices and for systems, such as, for example, software routines, device controllers, power supplies, cameras, lighting equipment, pressure regulators, and other apparatuses or devices that may be used in conjunction with the optical component assembly and measuring apparatus of the invention. Therefore, the initialization process is generally configured to initialize the x, y, and z position of the workpiece support relative to the optical measuring equipment. Further, the initialization processes are configured to align the respective axes of the apparatus with each other, i.e., aligning the x and y axes to be exactly perpendicular to each other, while also positioning the Z axis perpendicular to the x and y axes.

Once the initialization process is complete, and the palette or fixture is mounted on the working surface of the press and measurement apparatus of the invention, that the method may continue to step 805, wherein the apparatus measures the facet location of the component without the power being applied to the optical source. The measured facet location may then be recorded by an automated control system in communication with the apparatus, such as, for example, a microprocessor based controller configured to control the operation of various components of the invention. In the illustrated embodiment, the microprocessor based controller may include a personal computer configured to receive input from the measuring device, where the input may represent data corresponding to the measured facet location, and place the input into a storage medium, such as a hard drive or other commonly used computer storage medium. Thereafter, this input may be accessible to various other control systems, such that the measured facet location of the particular component may be used to conduct various other assembly or modification processes on the particular component in conjunction with the measurements taken within the press and measuring apparatus of the attention. Once the power off facet location has been measured at step 805, the exemplary method of the invention continues to step 806, where the optical source of the component being pressed and measured is powered on. Once the optical source of the component is powered on, the method continues to step 807. At step 807 an initial measurement is taken of the optical output of the component with the optical source powered on. This initial measurement is generally a rough measurement configured to determine if the component is within tolerances. For example, if the optical output of the component is extremely misaligned, it may not be possible to correct for the misalignment, and therefore, the component may be discarded. Therefore, embodiments of the invention provide an apparatus that method configured to eliminate parts that are not within an initial tolerance range immediately without expending time and resources on the assembly and measurement process. As such, that method apparatus of the invention provides an efficient and accurate way of eliminating bad order parts prior to expending resources on processing the invention order parts.

Once the optical device is powered up in step 806, a measurement device, such as a camera or other device configured to receive and determine the position of the optical signal output from the component being assembled, may be used to determine both the x and y position of the optical output relative to a reference point, as well as the threshold power of the optical output, as illustrated steps 808 and 809. The measurements taken at steps 808 and 809 may be committed to a database that is accessible to various systems, as illustrated in its steps 810 and 811. Once the power on x and y coordinates are determined and stored in the database, the method continues to step 812 wherein the laser focus is determined. In this step, the laser focus is generally determined through careful selection of the z position of the camera relative to the output of the optical device. Furthermore, both the x and y positions may be varied during the focus determination, such that the field of view of the camera is consistently able to capture the entire optical signal emitted by the optical component. Thus, in order to determine the laser focus the present invention, the apparatus essentially scans in the z direction looking for a predetermined or desired contrast that generally corresponds to laser focus, while maintaining the contrast invention within the field of view of the camera via adjustment of the x and y position of the camera or the fixture having the component secured therein. The process of adjusting the x, y, and z position is represented by step 813.

The data obtained in step 813 is then committed to a database for future use, as illustrated in step 814. The method further includes calculating the offset of the optical signal emitted from the optical component position within the measuring apparatus, as illustrated in step 815. More particularly, the process of calculating the offsets illustrated in step 815 may generally include determining the x coordinate, y coordinate, and z coordinate with respect to a reference point, plane, or axis of the system, wherein the x, y, and z coordinates generally corresponds to the position of the optical signal at the location or the optical signal is in focus, i.e., the focal point. Additionally, step 815 includes the process of calculating a pointing angle, wherein the pointing angle generally corresponds to the angle between a horizontal axis extending from the optical source to a separate axis extending from the emission point of the optical source to the point on the reference plane in the determined z position. Thus, the pointing angle generally corresponds to the angle between the optimal signal trajectory axis, i.e., the axis upon which the optical signal would travel away from the optical component if there were zero offset present in the component, and the axis upon which the optical signal actually travels away from the optical component. Since these two axes are different, the pointing angle represents the angle between the respective axes.

Once the respective components of the offset are calculated, the components are generally committed to one or more databases, as illustrated in step 816. In the exemplary embodiment illustrated in FIG. 8a, individual databases are set up to receive the individual plane or components, as well as a separate database configured to receive the pointing angle for each component measured in the exemplary apparatus of the invention. With the optical offset measured and recorded, the method of the invention generally continues to step 817, where the optical component is removed from the fixture or palette of the invention. Thereafter, the optical component may be moved to a separate apparatus configured to compensate for the optical offset inherently present within the optical component, wherein the optical offset has been measured and stored in the above noted databases, as illustrated in step 818.

Once the optical component is moved to a second machine configured to mechanically adjust the optical offset of the component, as stated in step 818, the second machine may access the previously stored data, i.e., the data obtained at step 816, 810, 811, and 814, in order to determine what physical modifications may be made to the component to correct for the optical offset. For example, the information obtained in step 815 and stored in step 816 may be used to determine what portions of the outer diameter of the optical housing/optical component may be milled in order to counteract for the optical offset of the component. Put simply, the offset information may be used to determine what portions of the outer mounting surface of the optical component may be milled or shaved away in order to physically adjust the optical axis of the component such that the optical output is aligned with the center of the component, i.e., such that the optical offset of the output of the component is removed or at least counteracted via the physical adjustment of the mounting surfaces of the component, which is illustrated in step 819 and 820. Once the outer portion of the optical component is machined to adjust for the optical offset measured in the above noted process, the method may continue to press the laser into the housing at step 821, mount the optical component on the camera station at step 822, and then mechanically adjust for the optical housing, i.e., a bend component, at step 824, in order to finally align the optical output of the optical component. Once the final alignment has been made, the information corresponding to measurements of the optical component may be committed to a database at step 825. The information contained in the database may then be accessed by other component assembly processes, sales processes, test processes, and or any other processes associated with optical components such that the exact parameters of the component, i.e., the outer dimensions and the characteristics of the optical output, may be taken into account in subsequent processes.

Figure 9:
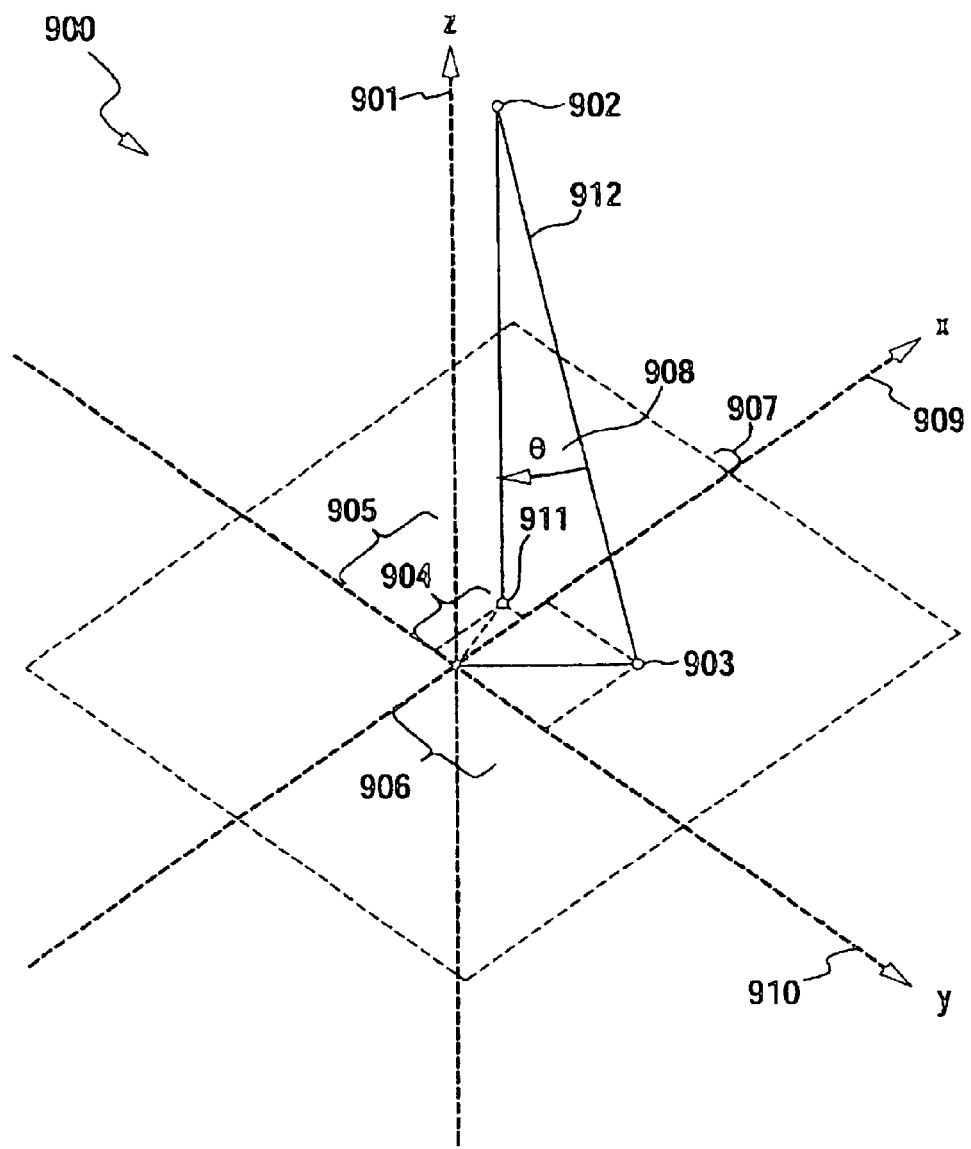
FIG. 9 illustrates a graphical view of the optical offset measurement process.

FIG. 9 illustrates a graphical view of the optical offset measurement process 900. The graphical illustration of measurement process 900 is best illustrated with respect to three reference axes, i.e., x axis 909, y axis 910, and z axis or machine 0 axis 901. The optical signal emitting end of the optical component being measured is generally represented by 902. Therefore, if the optical component to admitting the optical signal is perfectly aligned, then the optical signal will be transmitted therefrom and intersect the x-y plane at point 911, wherein point 911 is positioned directly below point 902. By away of example, if the point of optical emission corresponds with the machine 0 axis and the optical component is perfectly aligned, then the point at which the optical signal intersects the x-y plane will correspond with the intersection of axis 901, axis 910, and axis 909. When the optical point 911 does not correspond with the machine zero point, then the offset of point 911 may be measured, and generally is measured in terms of the x component of the machine offset 904 and the y component of the machine offset 906. However, regardless of the initial position of point 902, the measuring apparatus and method of the invention may calculate the optical offset of the component. More particularly, once the optical component to be measured is positioned within the apparatus of the invention, the optical component may be powered all on such that the 10 optical signal is admitted therefrom. The optical signal, which is generally represented by arrow 912 in FIG. 9, propagates towards the x-y plane and intersects the plane at point 903. Since point 903 does not correspond with point 911, it is apparent that the optical component has an offset. Therefore, embodiments of the invention are configured to measure the offset between point 903 and point 911, and furthermore, correct for the optical offset between the respective points.

Once point 903 is determined, the method of the present invention may calculate the x-component 905 of the optical offset, the y-component of the optical offset 906, the pointing angle 908, and the z-axis correction for the optical offset/focal point. In particular, trigonometric calculations may be used to determine each of the above noted in parameters from the measured position of point 903 in the measurement plane. However, the z-direction offset and the pointing angle are generally not measured parameters, as they need to be calculated from the measured parameters, i.e., the x and y components of the measured offset. Further, although the pointing angle is an important to the method of the invention, the calculation of the z-axis offset correction is critical to the future operation of the component. More particularly, as described in the methodology above, the measurement plane generally corresponds to the focal point of the component. However, the focal point of the component as measured corresponds to the focal point to at the offset, and therefore, once the offset is corrected, the focal point measured for the component with the offset when the longer be valid for the component with the offset corrected. By way of explanation, the path of optical signal 912 generally corresponds to the hypothenuse of a triangle consisting of a first side (the z direction side) and a second side (the reference plane side). Therefore, when the pointing angle is minimized, i.e., when the offset is corrected, then the hypothenuse generally corresponds with the first side of the previously mentioned triangle. Since the hypothenuse is always longer than either of the remaining sides of a triangle, it is apparent that the measured focal point of the optical component with the optical offset the will be shorter then the two focal point of the component with the optical offset corrected, as when the hypothenuse is swung toward the first side, it will be longer than the first side. Thus, it is important to calculate and record the z-offset correction, as this number will directly change the previously measured focal point distance of the component.

In another embodiment of the invention the press and measurement apparatus of the invention may be used to press an optical component into an optical housing proximate an optical source. More particularly, the apparatus of the invention may be used to press an optical lens into an optical housing having an optical source therein. In this type of pressing operation the lens may be pressed into the optical housing toward an optical source, such as a laser, for example, while the output of the component is observed or measured by the apparatus of the invention. Thus, the pressing operation, i.e., the depth to which the lens is pressed into the housing, may be controlled in accordance with the optical output of the component as the lens is pressed therein. More particularly, the optical output may be observed in order to press the lens to the optimal focal point of the device via observance of the optical output. The observance process may include observing and/or measuring the intensity, shape, configuration, contrast, and other parameters of the output and comparing the observed parameters to parameters corresponding to a component that is optimized. The comparison process may then be used to control the press operation to insure that the lens is pressed to the optimal depth, which is generally the focal point.

While the foregoing is directed to embodiments of the present invention, other and further embodiments of the invention may be devised without departing from the basic scope thereof, and the scope thereof is determined by the claims that follow

What is claimed is:

1. A pallet for pressing a lens into an optical housing, comprising:
    a substantially rigid base member having a press aperture formed therein;
    an optical housing support positioned above the press aperture;
    at least one pivotally mounted optical housing disengagement member; and
    a differential press screw assembly positioned on an opposing surface of the base member from the optical housing support.

2. The pallet of claim 1, wherein the optical housing support comprises a slidably positioned assembly clamp.

3. The pallet of claim 1, wherein the differential press screw comprises:
    an outer press assembly having a first outer threaded surface and a first inner threaded surface; and
    an inner press assembly having a second outer threaded surface configured to threadebly engage the first inner threaded surface, the inner press assembly having an extending lens press nut.

4. The pallet of claim 3, wherein the inner press assembly in configured to actuate toward the press aperture upon rotation of the outer press assembly and engagement of the first outer threaded surface with a threaded surface of the base member.

5. The pallet of claim 3, further comprising a screw actuator in communication with the outer press assembly.

6. The pallet of claim 1, wherein the at least one pivotally mounted disengagement member comprises two opposingly positioned release latches configured to pivot upward to disengage the optical housing from the optical housing support after the lens is pressed therein.

7. The pallet of claim 1, wherein the differential press screw assembly further comprises a longitudinal bore formed therethrough, the longitudinal bore being configured transmit an optical signal from the optical housing to a measuring apparatus positioned below the differential press screw assembly.

8. An assembly for pressing a lens into an optical housing, comprising:
    a base member having an aperture formed therethrough;
    an assembly clamp positioned on an upper surface of the base member above the aperture, the assembly clamp being configured to support the optical housing above the aperture during the pressing operation; and
    a differential press screw assembly positioned over the aperture and on a second surface of the base member, the differential press screw being configured to press a lens upward through the aperture into the optical housing.

9. The assembly of claim 8, comprising a pair of pivotally mounted release latches positioned adjacent the assembly clamp, the latches being configured to disengage the optical housing from the assembly clamp.

10. The assembly of claim 9, wherein the differential press screw assembly comprises:
    a first screw press having a first outer threaded surface and a first inner threaded surface, the first outer threaded surface being configured to threadebly engage a threaded surface of the base member; and
    a second screw press having a second outer threaded surface configured to threadebly engage the first inner threaded surface.

11. The assembly of claim 10, further comprising a lens press nut attached to the second screw press.

12. The assembly of claim 11, wherein the lens press nut is configured to support a lens thereon and extend through the aperture and into the optical housing to press the lens into the housing.

13. The assembly of claim 9, further comprising a screw actuator attached to the first screw press.

14. The assembly of claim 13, wherein the screw actuator comprises a motor in communication with a controller, the controller being configured actuate the motor in response to measurements taken from the optical component while the lens is being pressed into the optical housing.

15. The assembly of claim 10, wherein the first screw press and the second screw press comprise a longitudinal optical signal transmission bore formed therethrough.

16. A fixture for assembling an optical component, comprising:
- a substantially rigid base member having an upper surface, a lower surface, and a base aperture connecting the upper and lower surfaces;
- a component mounting plate positioned on the upper surface and having an aperture formed therein that is positioned to correspond with the base aperture;
- at least one pivotally mounted component disengagement member positioned on the upper surface and being configured to disengage a component from the mounting plate;
- a component securing member slidably positioned on the upper surface and being configured to secure a component in the aperture of the mounting plate; and
- a differential press screw positioned on the lower surface and extending through the aperture.

17. The fixture of claim 16, wherein the at least one pivotally mounted component disengagement member comprises two opposingly positioned pivotal latches having distal extending members that are configured to disengage an optical component from the aperture of the mounting plate.

18. The fixture of claim 16, wherein the component securing member comprises a slidable member having two extending fingers that are configured to secure the optical component in the aperture of the mounting plate when the fingers are positioned above the mounting plate aperture.

19. The fixture of claim 16, wherein the differential press screw comprises:
- an outer screw press having a first outer threaded surface and a first inner threaded surface; and
- an inner screw press having a second outer threaded surface configured to threadably engage the first inner threaded surface, wherein the first outer threaded surface threadebly engages the base member while the first inner surface threadably engages the second outer threaded surface to longitudinally actuate the inner screw press.

20. The fixture of claim 19, further comprising a lens press nut positioned in communication with the inner screw press.

21. The fixture of claim 20, further comprising a screw actuator positioned in communication with the outer screw press.

22. The fixture of claim 21, wherein actuation of the screw actuator is configured to longitudinally extend the lens press nut toward the optical component and press a lens positioned thereon into the optical component.

* * * * *

UNITED STATES PATENT AND TRADEMARK OFFICE
CERTIFICATE OF CORRECTION

| | |
|---|---|
| PATENT NO. | : 6,983,533 B2 |
| APPLICATION NO. | : 10/417624 |
| DATED | : January 10, 2006 |
| INVENTOR(S) | : Martin Wisecarver |

It is certified that error appears in the above-identified patent and that said Letters Patent is hereby corrected as shown below:

Column 1
Line 12, after "relate to" change "and" to --an--
Line 30, before "is desirable" insert --it--

Column 2
Line 12, remove [Position based on optical measurement system focus.]
Line 14, change "Z-Camera" to --z-Camera--
Line 36, change "adjust" to --adjusting--
Line 38, change "determine" to --determining--
Line 38, change "adjust" to --adjusting--
Line 39, change "re-verify" to --re-verifying--
Line 39, change "scan" to --scanning--
Line 40, change "subtract" to --subtracting--
Line 41, change "drive" to --driving--
Line 41, change "take" to --taking--
Line 42, change "calculate" to --calculating--
Line 42, change "drive" to --driving--
Line 43, change "release" to --releasing--

Column 3
Line 53, change "8a" to --8A--

Column 4
Line 1, before "are generally" insert --and--
Line 13, remove [actuators]
Line 46, after "fixture support" remove [member]
Line 47, change "200" to --202--
Line 50, change both instances of "Z" to --z--
Line 52, change "Z" to --z--
Line 53, change "Z" to --z--
Line 55, change "Z" to --z--
Line 57, change "Z" to --z--
Line 60, change "Z" to --z--

UNITED STATES PATENT AND TRADEMARK OFFICE
CERTIFICATE OF CORRECTION

PATENT NO. : 6,983,533 B2
APPLICATION NO. : 10/417624
DATED : January 10, 2006
INVENTOR(S) : Martin Wisecarver It is certified that error appears in the above-identified patent and that said Letters Patent is hereby corrected as shown below:

Column 5
Line 1, change "Z" to --z--
Line 14, change "X" to --x--
Line 17, change "actuators" to --actuator--
Line 18, change "X" to --x--
Line 19, change "actuators" to --actuator--
Line 20, change "Y" to --y--
Line 35, remove [was]
Line 53, change "unit" to --tool--
Line 62, change "205" to --207--

Column 6
Line 14, change "pivotally mounted arm 309" to --pivot mount 305--
Line 17, change "members" to --member--
Lines 17 and 18, change "members 308 are" to --member 308 is--
Line 19, before "pivot mount" change "a" to --the--
Line 27, change "mounts" to --mount--
Line 40, after "component" insert --404--
Line 47, change "supports" to --support--

Column 8
Line 9, after "latches" insert --702--
Line 14, change "threadebly" to --threadably--
Line 26, after "Screw actuator" insert --801--
Line 27, change "threadebly" to --threadably--
Line 35, change "threadebly" to --threadably--
Line 36, after "screw actuator" insert --801--

UNITED STATES PATENT AND TRADEMARK OFFICE
CERTIFICATE OF CORRECTION

PATENT NO. : 6,983,533 B2
APPLICATION NO. : 10/417624
DATED : January 10, 2006
INVENTOR(S) : Martin Wisecarver It is certified that error appears in the above-identified patent and that said Letters Patent is hereby corrected as shown below:

Column 9
Line 12, change "8a" to --8A--
Line 14, change "8a" to --8A--
Line 27, change "8a" to --8A--
Line 30, change "8a" to --8A--
Line 38, change "801" to --830--
Line 57, change "803 and 804" to --833 and 834--
Line 58, change "8a illustrate" to --8A illustrates--
Line 62, change "803" to --833--
Line 65, change "803" to --833--
Line 66, change "Z" to --z--
Line 67, change "Z" to --z--

Column 10
Line 2, change "Z" to --z--
Line 2, change "804" to --834--
Line 4, before "initialization" change "and" to --an--
Line 22, remove [that]
Line 23, change "805" to --835--
Line 42, change "805" to --835--
Line 43, change "806" to --836--
Line 46, change "807". At step 807" to --837. At step 837--
Line 55, remove [that method]
Line 58, change "that method" to --the--
Line 62, change "806" to --836--

Column 11
Line 1, change "808" to --838--
Line 2, change "809. The" to --839--
Line 2, change "808 and 809" to --838 and 839--
Line 31, change "corresponds" to --correspond--
Line 32, after "at the location" change "or" to --where--
Line 50, change "8a" to --8A--
Line 67, change "810" to --840--

UNITED STATES PATENT AND TRADEMARK OFFICE
CERTIFICATE OF CORRECTION

PATENT NO. : 6,983,533 B2
APPLICATION NO. : 10/417624
DATED : January 10, 2006
INVENTOR(S) : Martin Wisecarver It is certified that error appears in the above-identified patent and that said Letters Patent is hereby corrected as shown below:

Column 12
Line 36, remove [or machine 0 axis]
Line 38, change "to admitting" to --emitting--
Line 42, change "away" to --way--
Line 43, change "0" to --zero--
Line 51, change "906" to --913--
Line 56, remove [all]
Line 56, remove [10]

Column 13
Line 10, before "important" remove [an]
Line 15, after "focal point" remove [to]
Line 17, change "when the" to --will no--
Line 28, after "offset" remove [the]
Line 29, change "then the two focal point" to --than the two focal points--
Line 56, change "insure" to --ensure--
Line 62, after "follow" insert --.--

UNITED STATES PATENT AND TRADEMARK OFFICE
CERTIFICATE OF CORRECTION

PATENT NO. : 6,983,533 B2
APPLICATION NO. : 10/417624
DATED : January 10, 2006
INVENTOR(S) : Martin Wisecarver It is certified that error appears in the above-identified patent and that said Letters Patent is hereby corrected as shown below:

<u>Column 14</u>
Line 16, Claim 3 change "threadebly" to --threadably--
Line 20, Claim 4 change "in" to --is--
Line 33, Claim 7 after "configured" insert --to--
Line 57, Claim 10 change "threadebly" to --threadably--
Line 60, Claim 10 change "threadebly" to --threadably--

<u>Column 15</u>
Line 5, Claim 14 after "configured" insert --to--

<u>Column 16</u>
Line 16, Claim 19 change "threadebly" to --threadably--

Signed and Sealed this

Twenty-fourth Day of March, 2009

JOHN DOLL
*Acting Director of the United States Patent and Trademark Office*